(12) United States Patent
Rodriguez

(10) Patent No.: US 8,461,809 B2
(45) Date of Patent: *Jun. 11, 2013

(54) POWER CONDITIONING UNIT

(75) Inventor: Cuauhtemoc Rodriguez, Impington (GB)

(73) Assignee: Enecsys Limited, Cambridge (GB)

( * ) Notice: Subject to any disclaimer, the term of this patent is extended or adjusted under 35 U.S.C. 154(b) by 0 days.

This patent is subject to a terminal disclaimer.

(21) Appl. No.: 13/276,849

(22) Filed: Oct. 19, 2011

(65) Prior Publication Data

US 2012/0039099 A1 Feb. 16, 2012

Related U.S. Application Data

(63) Continuation of application No. 12/160,743, filed as application No. PCT/GB2007/050014 on Jan. 12, 2007.

(30) Foreign Application Priority Data

Jan. 13, 2006 (GB) .................................. 0600658.9

(51) Int. Cl.
*G05F 1/70* (2006.01)
(52) U.S. Cl.
USPC .............................. 323/207; 323/906; 363/16
(58) Field of Classification Search
USPC .............................. 323/207, 906; 363/16, 131
See application file for complete search history.

(56) References Cited

U.S. PATENT DOCUMENTS

| 2,852,721 | A | 9/1958 | Harders et al. |
| 4,479,175 | A | 10/1984 | Gille et al. |
| 4,626,983 | A | 12/1986 | Harada et al. |

(Continued)

FOREIGN PATENT DOCUMENTS

| DE | 19937410 | 2/2001 |
| DE | 10064039 A | 12/2001 |

(Continued)

OTHER PUBLICATIONS

Martins, et al.: "*Interconnection of a Photovoltaic Panels Array to a Single-Phase Utility Line From a Static Conversion System*"; Power Electronics Specialists Conference, 2000. PESC 00. 2000 IEEE 31$^{st}$ Annual; Jun. 18-23, 2000; ISSN: 0275-9306; pp. 1207-1211, vol. 3.

(Continued)

*Primary Examiner* — Shawn Riley
(74) *Attorney, Agent, or Firm* — Adeli & Tollen LLP

(57) ABSTRACT

The present invention relates to a power conditioning unit for delivering power from a dc power source to an ac output, particularly ac voltages greater than 50 volts, either for connecting directly to a grid utility supply, or for powering mains devices independent from the mains utility supply. We describe a power conditioning unit for delivering power from a dc power source to an ac mains output, the power conditioning unit comprising an input for receiving power from said dc power source, an output for delivering ac power, an energy storage capacitor, a dc-to-dc converter having an input connection coupled to said input and an output connection coupled to the energy storage capacitor, and a dc-to-ac converter having an input connection coupled to said energy storage capacitor and an output connection coupled to said output, wherein said energy storage capacitor has a capacitance of less than twenty microfarads.

20 Claims, 4 Drawing Sheets

U.S. PATENT DOCUMENTS

| | | | |
|---|---|---|---|
| 4,772,994 | A | 9/1988 | Harada et al. |
| 5,329,222 | A | 7/1994 | Gyugyi et al. |
| 5,381,327 | A | 1/1995 | Yan |
| 5,404,059 | A | 4/1995 | Löffler |
| 5,576,941 | A | 11/1996 | Nguyen et al. |
| 5,585,749 | A | 12/1996 | Pace et al. |
| 5,814,970 | A | 9/1998 | Schmidt |
| 5,930,131 | A | 7/1999 | Feng |
| 6,021,052 | A | 2/2000 | Unger et al. |
| 6,058,035 | A | 5/2000 | Madenokouji et al. |
| 6,081,104 | A | 6/2000 | Kern |
| 6,219,623 | B1 * | 4/2001 | Wills ............................. 702/60 |
| 6,281,485 | B1 * | 8/2001 | Siri ............................. 250/203.4 |
| 6,339,538 | B1 | 1/2002 | Handleman |
| 6,369,461 | B1 | 4/2002 | Jungreis et al. |
| 6,445,599 | B1 | 9/2002 | Nguyen |
| 6,657,419 | B2 | 12/2003 | Renyolds |
| 6,678,174 | B2 | 1/2004 | Suzui et al. |
| 6,856,102 | B1 | 2/2005 | Lin et al. |
| 6,888,728 | B2 | 5/2005 | Takagi et al. |
| 6,950,323 | B2 | 9/2005 | Achleitner et al. |
| 6,980,783 | B2 | 12/2005 | Liu et al. |
| 7,031,176 | B2 | 4/2006 | Kotsopoulos et al. |
| 7,064,967 | B2 | 6/2006 | Ichinose et al. |
| 7,078,883 | B2 | 7/2006 | Chapman et al. |
| 7,099,169 | B2 | 8/2006 | West et al. |
| 7,193,872 | B2 | 3/2007 | Siri |
| 7,262,979 | B2 | 8/2007 | Wai et al. |
| 7,319,313 | B2 | 1/2008 | Dickerson et al. |
| 7,324,361 | B2 | 1/2008 | Siri |
| 7,339,287 | B2 | 3/2008 | Jepsen et al. |
| 7,414,870 | B2 | 8/2008 | Röttger et al. |
| 7,432,691 | B2 | 10/2008 | Cutler |
| 7,450,401 | B2 | 11/2008 | Iida |
| 7,463,500 | B2 | 12/2008 | West |
| 7,466,566 | B2 | 12/2008 | Fukumoto |
| 7,479,774 | B2 | 1/2009 | Wai et al. |
| 7,885,085 | B2 | 2/2011 | Orr et al. |
| 7,919,953 | B2 | 4/2011 | Porter et al. |
| 8,089,785 | B2 | 1/2012 | Rodriguez |
| 8,139,382 | B2 | 3/2012 | Zhang et al. |
| 8,184,460 | B2 | 5/2012 | O-Brien et al. |
| 8,363,427 | B2 * | 1/2013 | Anguelov et al. ............... 363/16 |
| 2001/0023703 | A1 | 9/2001 | Kondo et al. |
| 2002/0034083 | A1 | 3/2002 | Ayyanar et al. |
| 2002/0085397 | A1 | 7/2002 | Suzui et al. |
| 2002/0118559 | A1 | 8/2002 | Kurokami et al. |
| 2002/0177401 | A1 | 11/2002 | Judd et al. |
| 2003/0193821 | A1 | 10/2003 | Krieger et al. |
| 2004/0076028 | A1 | 4/2004 | Achleitner et al. |
| 2004/0117676 | A1 | 6/2004 | Kobayashi et al. |
| 2004/0165408 | A1 | 8/2004 | West et al. |
| 2004/0207366 | A1 | 10/2004 | Sung |
| 2004/0233685 | A1 | 11/2004 | Matsuo et al. |
| 2005/0030772 | A1 | 2/2005 | Phadke |
| 2005/0068012 | A1 | 3/2005 | Cutler |
| 2005/0242795 | A1 | 11/2005 | Al-Kuran et al. |
| 2006/0232220 | A1 | 10/2006 | Melis |
| 2007/0035975 | A1 | 2/2007 | Dickerson et al. |
| 2007/0158185 | A1 | 7/2007 | Andelman et al. |
| 2007/0290656 | A1 | 12/2007 | Keung |
| 2008/0055941 | A1 | 3/2008 | Victor et al. |
| 2008/0097655 | A1 | 4/2008 | Hadar et al. |
| 2008/0205096 | A1 | 8/2008 | Lai et al. |
| 2008/0266919 | A1 | 10/2008 | Mallwitz |
| 2008/0285317 | A1 | 11/2008 | Rotzoll |
| 2008/0291707 | A1 | 11/2008 | Fang |
| 2008/0304296 | A1 | 12/2008 | NadimpalliRaju et al. |
| 2008/0304298 | A1 | 12/2008 | Toba et al. |
| 2009/0080226 | A1 | 3/2009 | Fornage |
| 2009/0097283 | A1 | 4/2009 | Krein et al. |
| 2010/0002470 | A1 | 1/2010 | Kiamilev et al. |
| 2010/0052425 | A1 | 3/2010 | Moore et al. |
| 2010/0195361 | A1 | 8/2010 | Stem |
| 2010/0207455 | A1 | 8/2010 | Erickson, Jr. et al. |
| 2010/0246230 | A1 | 9/2010 | Porter et al. |
| 2010/0309692 | A1 | 12/2010 | Chisenga et al. |
| 2010/0309695 | A1 | 12/2010 | Fornage |
| 2011/0210694 | A1 | 9/2011 | Uehashi et al. |
| 2012/0033463 | A1 | 2/2012 | Rodriguez |

FOREIGN PATENT DOCUMENTS

| | | |
|---|---|---|
| EP | 0340006 | 11/1989 |
| EP | 0 780 750 A2 | 6/1997 |
| EP | 0780750 | 6/1997 |
| EP | 0 947 905 A2 | 10/1999 |
| EP | 1235339 A | 8/2002 |
| EP | 1239576 | 9/2002 |
| EP | 1974453 | 10/2008 |
| GB | 1261838 | 1/1972 |
| GB | 2415841 | 1/2006 |
| GB | 2415841 A | 1/2006 |
| GB | 2419968 | 5/2006 |
| GB | 2419968 A | 5/2006 |
| GB | 2434490 | 7/2007 |
| GB | PCT/GB2007/050014 | 7/2008 |
| GB | 0600658 | 2/2009 |
| GB | 0901815 | 2/2009 |
| GB | 2454389 | 5/2009 |
| GB | 2454389 A | 5/2009 |
| GB | 2478789 | 9/2011 |
| GB | 2478789 A | 9/2011 |
| JP | 01-311874 | 12/1989 |
| JP | 05003678 | 1/1993 |
| JP | 05003678 A | 1/1993 |
| JP | 07-028538 | 1/1995 |
| JP | 08-227324 | 9/1996 |
| JP | 08-317664 | 11/1996 |
| JP | 10-174452 | 6/1998 |
| JP | 2000-020150 | 1/2000 |
| JP | 2000020150 A | 1/2000 |
| JP | 2000-316282 | 11/2000 |
| JP | 2000-347753 | 12/2000 |
| JP | 2001-178145 | 6/2001 |
| JP | 2002-238246 | 8/2002 |
| JP | 2002-270876 | 9/2002 |
| JP | 2002-354677 | 12/2002 |
| WO | WO 96/07130 A | 3/1996 |
| WO | 2004/001942 | 12/2003 |
| WO | WO 04/001942 A1 | 12/2003 |
| WO | WO 2004/001942 A1 | 12/2003 |
| WO | WO 2004/006342 A | 1/2004 |
| WO | WO 2004/008619 A2 | 1/2004 |
| WO | WO 2005/015584 A2 | 2/2005 |
| WO | 2006/011071 | 2/2006 |
| WO | WO 2006/011071 A2 | 2/2006 |
| WO | WO 2007/080429 A2 | 7/2007 |
| WO | 2007/111868 | 10/2007 |
| WO | WO 2007/111868 A1 | 10/2007 |
| WO | 2007/124518 | 11/2007 |
| WO | 2008/092055 | 7/2008 |
| WO | 2009/051853 | 4/2009 |
| WO | WO 2009/134756 A1 | 11/2009 |

OTHER PUBLICATIONS

Kimball, et al.: "*Analysis and Design of Switched Capacitor Converters*"; Grainger Center for Electric Machinery and Electromechanics, University of Illinois at Urbana-Champaign, 1406 W. Green St, Urbana, IL 61801 USA, © 2005 IEEE; pp. 1473-1477.

International Search Report for corresponding PCT/GB2007/050014 completed Jan. 15, 2008 by Michael Lund of the EPO.

Kotsopoulos, et al.: "*Predictive DC Voltage Control of Single-Phase PV Inverters with Small DC Link Capacitance*", IEEE Intn'l Symposium 2003, pp. 793-797.

Search Report for corresponding GB 1009430.8, date of search: Dec. 9, 2010.

Krein, et al.: "*Cost-Effective Hundred-Year Life for Single-Phase Inverters and Rectifiers in Solar and LED Lighting Applications Based on Minimum Capacitance Requirements and a Ripple Power Port*"; Applied Power Electronics Conference and Exposition, Feb. 15-19, 2009, pp. 620-625; ISSN: 1048-2334; ISBN: 978-1-4244-2811-3.

"SolarMagic™ Power Optimizer Integrated Smart Panel Chipset Maximizes PV System Efficiency at the Lowest Cost Per kWh"; SM3320-1A1 Power Optimizer Specifications; www.solarmagic.com.

"DC Combiner Box Enables Better Awareness for Active Management"; SolarMagic™ DC Monitoring Combiner Box Specifications; www.solarmagic.com.

Portions of prosecution history of U.S. Appl. No. 12/160,743, Sep. 14, 2011, Rodriguez, Cuauhtemoc.

Portions of prosecution history of U.S. Appl. No. 13/276,885, Nov. 7, 2012, Rodriguez, Cuauhtemoc.

"DC Combiner Box Enables Better Awareness for Active Management," SolarMagic DC Monitoring Combiner Box Specifications, Apr. 2011, 2 pages, National Semiconductor Corporation.

"SolarMagic power optimizer; Integrated Smart Panel Chipset Maximizes PV System Efficiency at the Lowest Cost per kWh," SM3320-1A1 Power Optimizer Specifications, Sep. 2010, 2 pages, National Semiconductor Corporation.

Krein, Philip T., et al., "Cost-Effective Hundred-Year Life for Single-Phase Inverters and Rectifiers in Solar and LED Lighting Applications Based on Minimum Capacitance Requirements and a Ripple Power Port," Applied Power Electronics Conference and Exposition, Feb. 15-19, 2009, pp. 620-625.

Calais, Martina, et al., "Inverters for Single-Phase Grid Connected Photovoltaic Systems—Overview and Prospects," Proceedings of the $17^{th}$ European Photovoltaic Solar Energy Conference, Oct. 22-26, 2001, pp. 437-440, Munich, Germany.

Kikuchi, Naoto, et al., "Single Phase Amplitude Modulation Inverter for utility Interactive Photovoltaic System," IECON '99 Proceedings, Nov. 29-Dec. 3, 1999, pp. 385-389, IEEE.

Kjaer, Soeren Baekhoej, et al., "Design Optimization of a Single Phase Inverter for Photovoltaic Applications," IEEE $34^{th}$ Annual Power Electronics Specialist Conference, Jun. 15-19, 2003, pp. 1183-1190, vol. 3, IEEE.

Koutroulis, Eftichios, et al., "Development of a Microcontroller-Based, Photovoltaic Maximum Power Point Tracking Control System," IEEE Transactions on Power Electronics, Jan. 2001, pp. 46-54, vol. 16, No. 1, IEEE.

Marra, Enes Goncalves et al., "Self-Excited Induction Generator Controlled by a VS-PWM Converter Providing High Power-Factor Current to a Single-Phase Grid," Proceedings of the $24^{th}$ Annual Conference of IEEE, Aug. 31-Sep. 4, 1998, pp. 703-708, vol. 2, IEEE.

Mumtaz, Asim, et al., "Grid Connected PV Inverter Using a Commercially Available Power IC," PV in Europe Conference, Oct., 2002, 3 pages, Rome, Italy.

Nonaka, Sakutaro, et al., "Interconnection System with Single Phase IGBT PWM CSI Between Photovoltaic Arrays and the Utility Line," Industry Applications Society Annual Meeting, Oct. 7-12, 1990, pp. 1302-1307, IEEE.

Rodriguez, Cuauhtemoc, et al., "Long-Lifetime Power Inverter for Photovoltaic AC Modules," IEEE Transactions of Industrial Electronics, Jul. 2008, pp. 2593-2601, vol. 55, No. 7, IEEE.

Shimizu, Toshihisa, et al., "A Flyback-type Single Phase Utility Interactive Inverter with Low-frequency Ripple Current Reduction on the DC Input for an AC Photovoltaic Module System," IEEE $33^{rd}$ Annual Power Electronics Specialist Conference, Month Unknown, 2002, pp. 1483-1488, vol. 3, IEEE.

Sun, Xiaofeng, et al., "A Research on Photovoltaic Energy Controlling System with Maximum Power Point Tracking," Proceedings of the Power Conversion Conference-Osaka, Apr. 2-5, 2002, pp. 822-826, vol. 2, IEEE.

Yatsuki, Satoshi, et al., "A Novel AC Photovoltaic Module System based on the Impedance-Admittance Conversion Theory," IEEE $32^{nd}$ Annual Power Electronics Specialists Conference, Month Unknown, 2001, pp. 2191-2196, vol. 4, IEEE.

* cited by examiner

POWER CONDITIONING UNIT

RELATED APPLICATIONS

The present invention is a Continuation of U.S. patent application Ser. No. 12/160,743, filed on May 4, 2010, now issued as U.S. Pat. No. 8,089,785, U.S. patent application Ser. No. 12/160,743 is a national stage application of PCT Application PCT/GB2007/050014, entitled "Power Conditioning Unit", filed on Jan. 12, 2007. PCT Application PCT/GB2007/050014 claims the benefit of United Kingdom Patent Application GB 0600658.9 filed Jan. 13, 2006. U.S. patent application Ser. No. 12/160,743, now issued as U.S. Pat. No. 8,089,785, is incorporated herein by reference.

BACKGROUND

The present invention relates to a power conditioning unit for delivering power from a dc power source to an ac output, particularly suitable for ac voltages greater than 50 volts, either for connecting directly to the mains or grid utility supply, or for powering mains devices directly, independent from the mains utility supply.

A number of power electronics converters have been produced in the past for research or commercial purposes, see for example EP0780750, EP0947905, and JP2000020150. In these solutions a capacitor is used as a reservoir and for filtering of high frequency currents. Further information may be found in US2005/0068012, JP05003678, GB2415841 and WO2006/011071. However, attention is not directly paid into the choice of capacitor and the control of energy input and output. It is common to encounter aluminum electrolytic capacitors in power supplies. These capacitors have lifetimes in the range of 2000 to 12000 hours, that is, up to 1.4 years of continuous service. In contrast other capacitor technologies, such as polyester, can achieve lifetimes of up to 500,000 hours or slightly more than 50 years. Therefore, it would be advantageous to provide a better lifetime of the power converter by using polyester or polypropylene capacitor. This is possible with the method of energy control explained herein.

We will describe a method to control direct current energy sources, in particular a method to control direct current energy sources that utilise power electronics converters to condition the input power into alternating current electricity that is supplied to the mains. Such power electronics converter comprises of a plurality of conversion stages and one energy reservoir in the form of a capacitor. The method presented allows the utilisation of long-lifetime polyester or polypropylene capacitors as opposed to short-lifetime electrolytic capacitors. The method consists of two control algorithms: one algorithm controls the power extracted from the energy source that is supplied to the energy reservoir and another controls the transfer of power from the reservoir into the electricity mains. We will describe controlling the voltage in the energy reservoir, as opposed to the supply voltage, which in turn controls the energy transfer. We will describe energy being supplied to the reservoir from the source (PV panel). To release that energy the voltage variation in the reservoir is used to define a current amplitude. We will describe how energy is stored in the power converter (in the energy reservoir) and how to use that energy to define a current injection into the mains.

According to an aspect of the invention, there is provided a power conditioning unit for delivering power from a dc power source to an ac mains power supply output, the power conditioning unit comprising an input for receiving power from said dc power source, an output for delivering ac power, an energy storage capacitor, a dc-to-dc converter having an input connection coupled to said input and an output connection coupled to the energy storage capacitor, and a dc-to-ac converter having an input connection coupled to said energy storage capacitor and an output connection coupled to said output, wherein said energy storage capacitor has a capacitance of less than twenty microfarads.

The ac mains power supply output may be connected to the utility grid, so that the power conditioning unit delivers power into the grid, or it may be a standalone power supply output for supplying power to electrical appliances.

The dc-to-dc converter may be configured to draw a substantially constant power from the dc power source regardless of a voltage on the energy storage capacitor. It may be configured to perform maximum power point tracking (MPPT) of the dc power source, and this may be achieved by maintaining a voltage or current from the dc power source substantially at a reference voltage or current. This may comprise controlling transistors in the dc-to-dc converter responsive both to the voltage or current from the dc power source and to a voltage or current to the energy storage capacitor.

The dc-to-ac converter may be configured to deliver a substantially sinusoidal current or voltage to the ac mains power supply output regardless of a voltage on the energy storage capacitor. This may be achieved by maintaining a current or voltage to the power supply output substantially at a reference sinusoid current or voltage. This may comprise controlling transistors in the dc-to-ac converter responsive both to a voltage or current from the energy storage capacitor and to the current or voltage to the power supply output.

The energy storage capacitor may comprise a non-electrolytic capacitor such as a film-type capacitor (for example polyester or polypropylene). The value of the capacitance may be directly proportional to the maximum power transfer capability, that is, the rated power of the apparatus. This value may be lower than an equivalent electrolytic capacitor in a conventional power conditioning unit with the same power rating. For example, less than 20 microfarads, less than 15 microfarads, less than 10 microfarads, less than 5 microfarads or another size available for a non-electrolytic capacitor.

According to another aspect of the invention, there is provided a dc-to-dc converter for delivering power from a dc power source to a dc output, the converter being configured to maintain a voltage on the dc power source substantially constant over a range of dc output voltages, the converter comprising an input for receiving power from said dc power source, an output for delivering dc power, at least one power device for transferring power from the input to the output, a sensing circuit for sensing a voltage on said input, and a driver circuit for driving said at least one power device responsive to said sensing to control said power transfer.

According to a further aspect of the invention, there is provided an inverter for delivering power from a dc power source to an ac output, the inverter being configured to maintain a substantially sinusoidal output voltage or current over a range of dc power source voltages, the inverter comprising an input for receiving power from said dc power source, an output for delivering ac power, at least one power device for transferring power from the input to the output, a low-pass filter coupled to said input, a sensing circuit for sensing an output from the low-pass filter and comparing with a reference, and a driver circuit for driving said at least one power device responsive to said sensing to control said power transfer.

According to a yet further aspect of the invention, there is provided a power conditioning unit for delivering power from a dc power source to an ac mains power supply output, wherein a link capacitor of the power conditioning unit connected in parallel between an output of a dc-to-dc converter of said power conditioning unit and an input of a dc-to-ac converter of said power conditioning unit is not an electrolytic capacitor.

According to another aspect of the invention, there is provided a method to control a power conditioning unit for delivering power from a dc source into the electricity supply, the power conditioning comprising the following: a plurality of inputs for connecting the dc power source, a plurality of output for connecting into the electricity supply, a power conversion stage for voltage conditioning of the dc power source, a power conversion stage for power injection into the electricity supply, a dc capacitor for energy buffering from the dc power source to the electricity supply.

BRIEF DESCRIPTION OF THE DRAWINGS

Embodiments of the invention will now be described in detail, with reference to the accompanying drawings, in which.

DETAILED DESCRIPTION

The present invention relates to a method of controlling the transfer of power from a dc energy source, such as a solar panel, fuel cell, dc wind turbine, etc, into the electricity mains supply, and in particular, this method allows the replacement of shortlifetime energy reservoirs for long-lifetime polyester or polypropylene capacitors.

Figure 1:
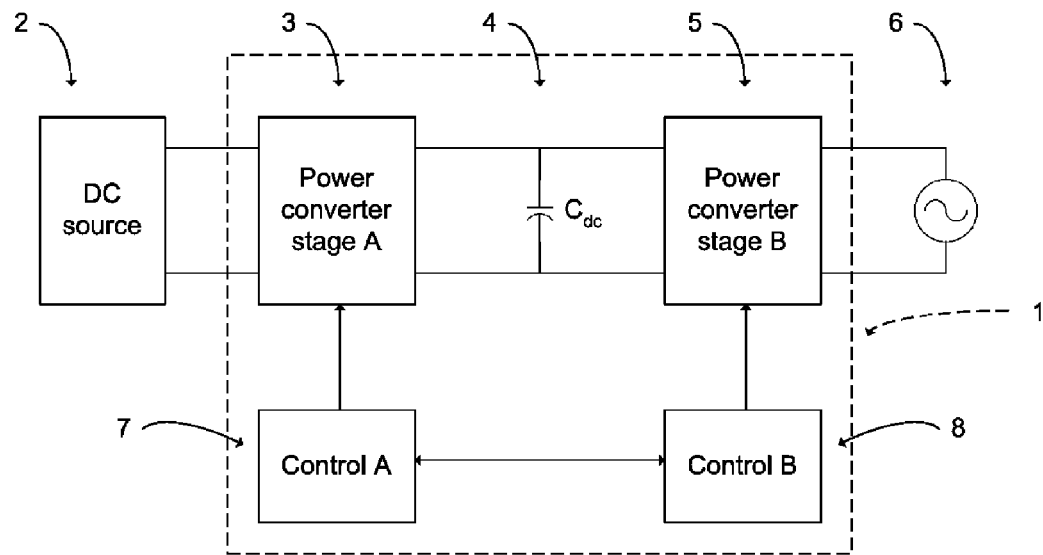
FIG. 1 shows a dc to ac system according to the present invention.

The energy control method can be used in any power electronics converter device (1) as shown in FIG. 1. This apparatus (1) is made of three major elements: a power converter stage A (3), one reservoir capacitor Cdc (4), and one power converter stage B (5). The apparatus (1) has a plurality of inputs connected to a direct current (dc) source, such as a solar or photovoltaic panel array (2) comprising one or more dc sources connected in series and/or in parallel. The apparatus (1) is also connected to the electricity supply (6) so that the energy extracted from the dc source (1) is transferred into the mains (6).

The power converter stage A (3) may be of different types: it can be a stepdown converter where the voltage at the input is decreased using some power electronics topology; it can be a step-up converter where the input voltage is amplified using a different type of power electronics circuit; or it can both amplify and attenuate the input voltage. In addition, it may provide electrical isolation by means of a transformer or a coupled inductor. In whatever case, the electrical conditioning of the input voltage must be such that the voltage across the capacitor Cdc (4) remains higher than the grid voltage (6) magnitude at all times. Also, this block contains one or more transistors, inductors, and capacitors. The transistor(s) are driven through a pulse width modulation (PWM) generator. The PWM signal(s) have variable duty cycle, that is, the ON time is variable with respect to the period of the signal. This variation of the duty cycle effectively controls the amount of power transferred across the power converter stage A (3).

The power converter stage B (5) injects current into the electricity supply (6). Therefore, the topology utilises some means to control the current flowing from the capacitor Cdc (4) into the mains (6). The circuit topology can be either a voltage source inverter or a current source inverter.

Figure 2:
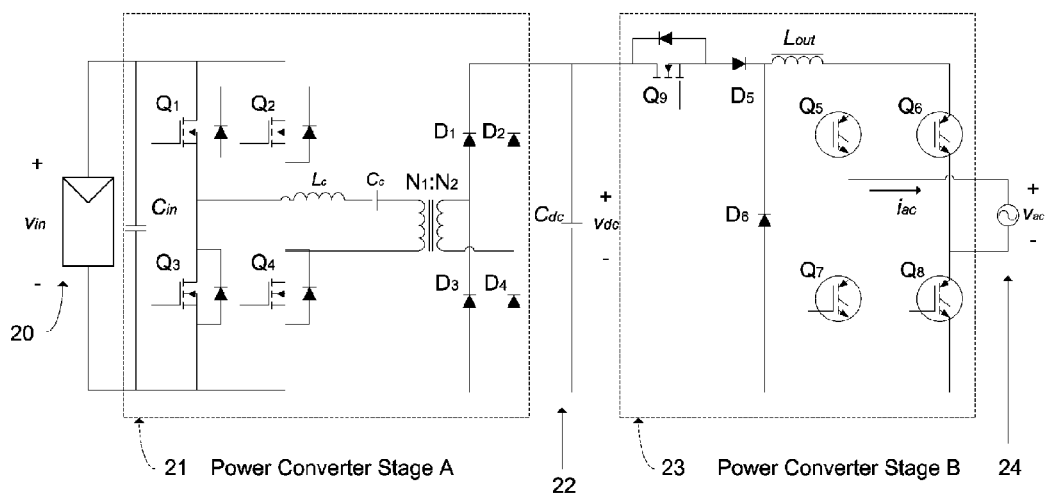
FIG. 2 shows an example of a power conditioning unit suitable for control by the system of FIG. 1.

FIG. 2 shows an example of a power conditioning unit to which the control system of FIG. 1 may be applied. Control A (7 in FIG. 1) may be connected to the input connections (e.g. gates or bases) of transistors in power converter stage A (21) to control the transfer of power from the dc energy source (20). The input of this stage is connected to the dc energy source and the output of this stage is connected to dc link capacitor 22. This capacitor stores energy from the dc energy source for delivery to the mains supply (24). Control A may be configured to draw a substantially constant power from the dc energy source regardless of the dc link voltage Vdc on Cdc.

Control B (8 in FIG. 1) may be connected to the input connections of transistors in power converter stage B (23) to control the transfer of power to the mains supply. The input of this stage is connected to the dc link capacitor and the output of this stage is connected to the mains supply. Control B may be configured to inject a substantially sinusoidal current into the mains supply regardless of the dc link voltage Vdc on Cdc.

Figure 3:
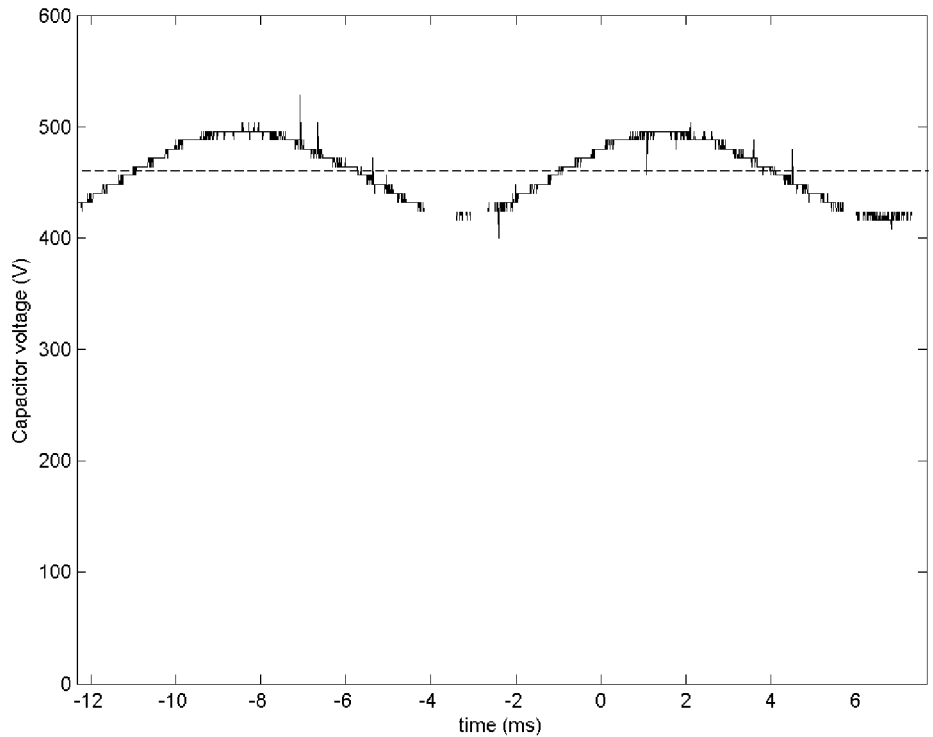
FIG. 3 shows DC capacitor voltage according to the present invention.

The capacitor Cdc (4) acts as an energy buffer from the input to the output. Energy is supplied into the capacitor via the power stage A (3) at the same time that energy is extracted from the capacitor via the power stage B (5). The current invention provides a control method that balances the average energy transfer and allows a voltage fluctuation, resulting from the injection of ac power into the mains (6), superimposed to the average dc voltage of the capacitor Cdc (4), as shown in FIG. 3. The figure shows an average voltage of 475V and a 100 Hz fluctuation of peak amplitude of 30V. The peak amplitude depends on the amount of power being transferred from the input (2 in FIG. 1) to the output (6). The frequency of the oscillation can be either 100 Hz or 120 Hz depending on the line voltage frequency (50 Hz or 60 Hz respectively).

Two synchronised and independent control blocks control the system (1): a control block A (7) that directly controls the power stage A (3), and a control block B (8) that directly controls the power stage B (5).

Figure 4:
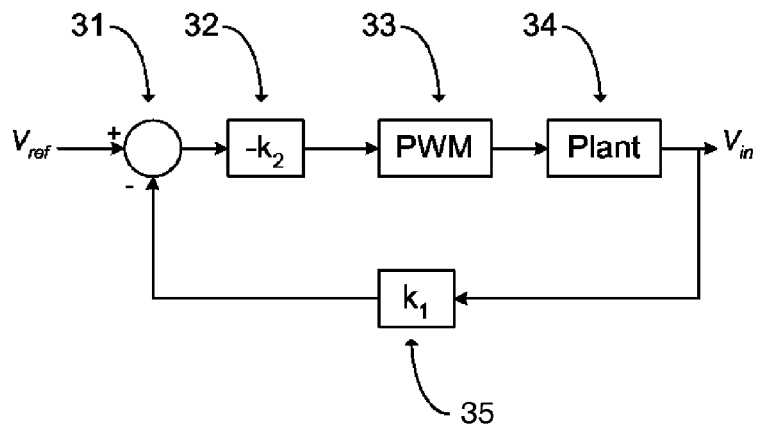
FIG. 4 shows control block A according to the present invention.

Control block A (7) has the configuration shown in FIG. 4. It comprises an adder (31), a negative proportional gain (32), a PWM generator (33), the system plant (34), and a feedback gain (35). This control block regulates the voltage across the dc source (2). This voltage, vin, is measured and adjusted by gain k1 (35). It is then subtracted to a voltage reference, vref, using the adder (31). The error, (vref-k1vin), is then amplified by a factor of −k2. The resulting signal is negatively proportional to the error. Therefore, a positive error generates a decrement in the driving signal and conversely. This driving signal is input to a PWM generator (33) that can be a microcontroller, or a PWM integrated circuit. This block generates digital pulses that, in turn, drive the transistors of the power stage A (3) that is equivalent to the plant (34).

Figure 5:
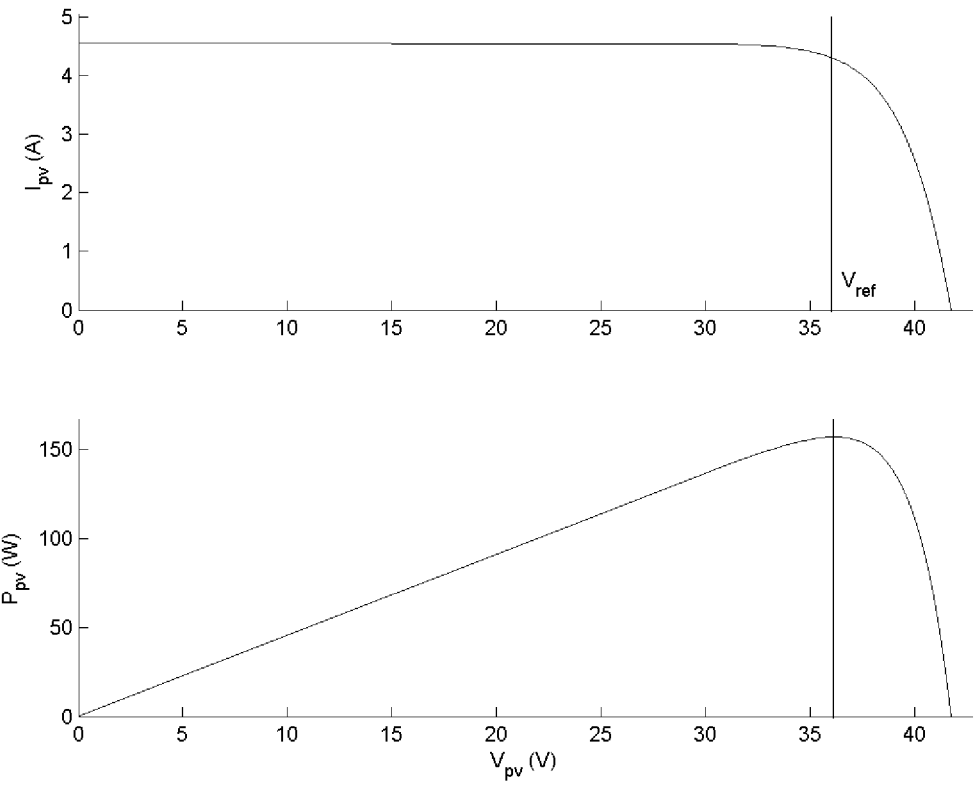
FIG. 5 shows characteristics of photovoltaic panel array as known in the art.

Controlling the dc source (2) voltage directly controls the power being transferred across power stage A (3) as is shown in FIG. 5 for a photovoltaic panel array.

Figure 6:
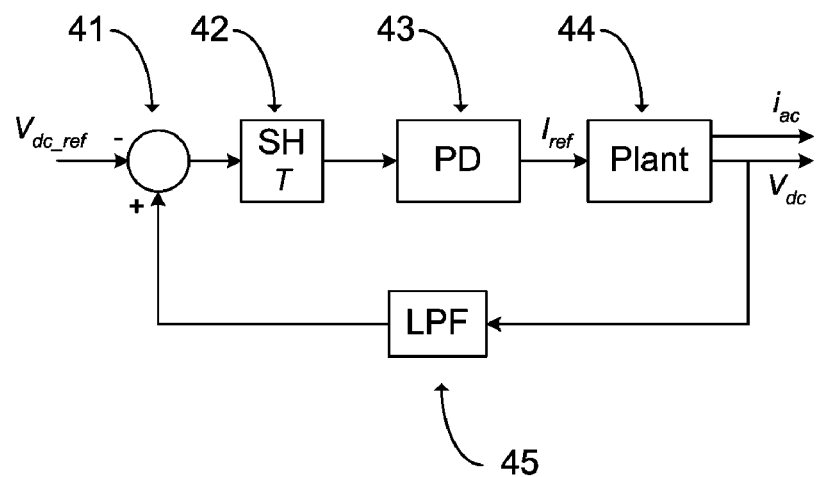
FIG. 6 shows control block B according to the present invention.

Control block B (8) has the configuration shown in FIG. 6. It composes of an adder (41), a sample and hold (SH) with period T block (42), a proportional-derivative (PD) compensator (43), the system plant (44), a low-pass filter (LPF) feedback block (45). This control block regulates the average voltage across capacitor Cdc (4). Because the voltage, vdc, contains the sum of a constant voltage and a fluctuating sinusoidal component, the signal is scaled and filtered using the LPF block (45). This generates a constant voltage that is compared against a reference, vdc_ref, using adder (41). The error is measured every T seconds using a Sample and Hold, SH, block (42). The resulting sampled error is forwarded to a PD compensator (43) that sets the amplitude of the current injected to the mains (6) via power stage B (5). The update of this current reference, Iref, amplitude is done every T seconds, which is the inverse of the line voltage frequency. Hence, it can take the values of 0.02 or 0.0167 seconds for a line frequency of 50 or 60 Hz respectively. This is needed in order to prevent current injection distortion.

Figure 7:
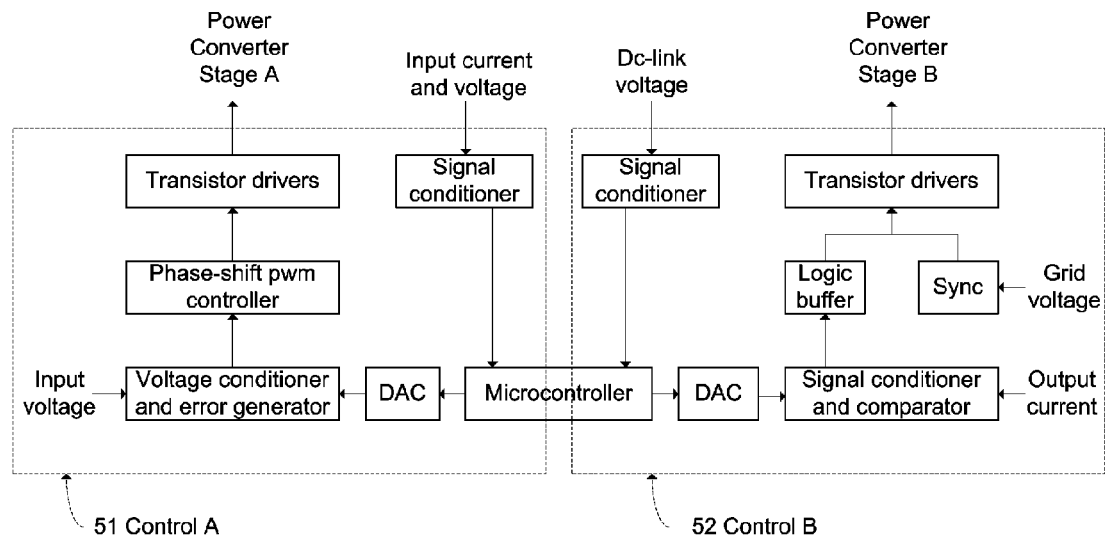
FIG. 7 shows an exemplary implementation of control blocks A and B according to the present invention.

An implementation of control blocks A and B is shown in FIG. 7. Both blocks operate independently but share a common microcontroller for simplicity. The microcontroller performs the control strategy depicted in FIG. 6 for block B. In addition the microcontroller could incorporate some means of maximum power point tracking control in case the input source is a photovoltaic panel in block A in order to generate a reference input voltage used in FIG. 4. Consequently the input voltage and current and the dc-link voltage are fed into the microcontroller via an arrangement of operational amplifiers or signal conditioning blocks.

The control shown in FIG. 4 for block A is implemented using analogue electronics in the form of operational amplifiers and the phase-shift pwm controller depicted in FIG. 7 (51). As mentioned before, the input voltage reference is obtained through the microcontroller via a digital to analogue converter (DAC). The proportional error is obtained inside the phase-shift pwm controller that, in turn, generates pwm signals for the transistors of stage A (21).

Implementation of control B (52) includes a current transducer that senses the rectified output current. This signal is conditioned to appropriate voltage levels using operational amplifiers and is then compared against a reference current. The reference current is generated in the microcontroller by an algorithm shown in FIG. 6 and the resulting digital word is sent to a DAC in order to get an analogue, instantaneous, current reference. Changes to the current magnitude are done in a periodic basis (with period equal to the grid voltage period) in order to avoid current distortion. The result of the comparison between the reference and the actual current is buffered through a D flip-flop which, in turn, drives transistor Q9 in FIG. 2. Transistors Q5-Q8 form a full-bridge that switches at line frequency using an analogue circuit synchronised with the grid voltage. Transistors Q5 and Q8 are on during the positive half cycle of the grid voltage and Q6 and Q7 are on during the negative half cycle of the grid voltage.

Figure 8:
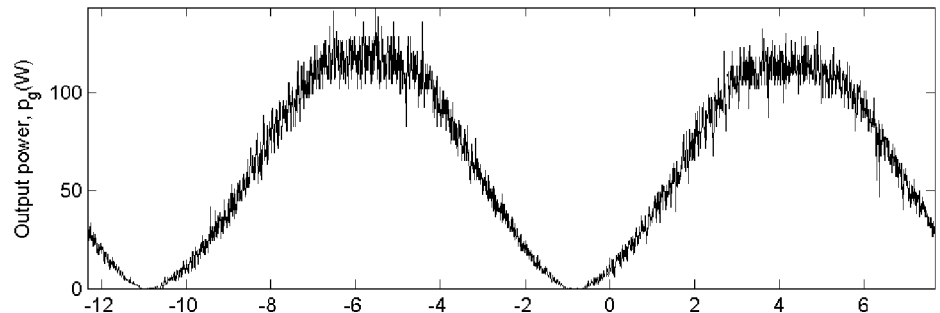
FIG. 8 shows output and input powers according to the present invention.
Figure 8:
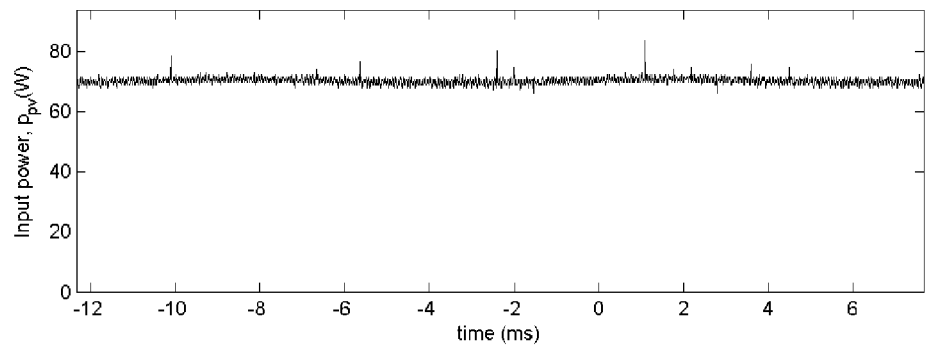

FIG. 8 shows the output and input powers using the aforementioned control. Clearly, the instantaneous power output is a sinusoid superimposed to an average positive value. In contrast, the input is constant throughout the period of the line voltage. The power difference creates and energy mismatch that is absorbed in capacitor Cdc. This effectively appears as a fluctuation across the capacitor, as is shown in FIG. 3.

No doubt many other effective alternatives will occur to the skilled person. It will be understood that the invention is not limited to the described embodiments and encompasses modifications apparent to those skilled in the art lying within the spirit and scope of the claims appended hereto.

What is claimed is:

1. A solar photovoltaic power conditioning unit for delivering power from a dc source into an electricity supply, the solar photovoltaic power conditioning unit comprising:
    an input for connecting a solar photovoltaic dc power source;
    an output for connecting to the electricity supply;
    a power conversion stage for voltage conditioning of the solar photovoltaic dc power source;
    a power conversion stage for power injection into the electricity supply;
    an energy storage capacitor for energy buffering from the solar photovoltaic dc power source to the electricity supply; and
    means for controlling an amount of power transferred by said power conversion stage for power injection into the electricity supply to said electricity supply based on a fluctuating sinusoidal component of a signal on said energy storage capacitor.

2. A power conditioning unit as claimed in 1, wherein said amount of power transferred is dependent on a peak amplitude of a fluctuating sinusoidal component of a dc voltage on said energy storage capacitor.

3. A power conditioning unit as claimed in claim 1, wherein said energy storage capacitor is a non-electrolytic capacitor.

4. A power conditioning unit as claimed in claim 1, further comprising two control blocks, a first of which controls the power conversion stage for voltage conditioning of the dc power source to the energy storage capacitor for energy buffering, and a second of which controls the power conversion stage for power injection into the electricity supply.

5. A power conditioning unit as claimed in claim 4, wherein the control block for the power conversion stage for voltage conditioning maintains a voltage at terminals of the dc power source substantially constant to thereby maintain a substantially constant flow of power from the dc power source into the energy storage capacitor.

6. A power conditioning unit as claimed in claim 5, wherein the control block for the power conversion stage for voltage conditioning utilises pulse width modulation (PWM) to control an amount of power transferred from the dc power source into the energy storage capacitor, and wherein the power conditioning unit further comprises a voltage sensor at the terminals of the dc power source used to acquire a voltage, a reading of which is further compared to a reference voltage in order to generate a proportional error that drives the PWM control.

7. A power conditioning unit according to claim 4, wherein the control block for the power conversion stage for power injection into the electricity supply maintains an average voltage of the energy storage capacitor constant by adjusting an amplitude of a current injection.

8. A power conditioning unit as claimed in claim 4, wherein the control block for the power conversion stage for power injection into the electricity supply controls a sinusoidal shape of a current injection into the electricity supply.

9. A power conditioning unit as claimed in claim 4, wherein the control block for the power conversion stage for power injection into the electricity supply includes a sensor for sensing the voltage across the energy storage capacitor and a system to compare a signal derived from said sensed voltage with a reference signal to generate an error signal, and wherein the control block for the power conversion stage for power injection into the electricity supply is further configured to generate a current amplitude reference in response to said error signal for controlling power injection into the electricity supply.

10. A solar photovoltaic power conditioning unit for delivering power from a solar photovoltaic dc power source to an ac mains power supply output, the solar photovoltaic power conditioning unit comprising:
- an input for receiving power from said solar photovoltaic dc power source;
- an output for delivering ac power to an ac mains power supply;
- an energy storage capacitor;
- a dc-to-dc converter having an input connection coupled to said input and an output connection coupled to the energy storage capacitor; and
- a dc-to-ac converter having an input connection coupled to said energy storage capacitor and an output connection coupled to said output;
- wherein said power conditioning unit further comprises a power injection control block having an input coupled to said energy storage capacitor and an output coupled to control said dc-to-ac converter, and
- wherein said power injection control block is configured to control an amplitude of an ac current provided to said ac mains power supply output such that an amount of power transferred to said ac mains power supply output is dependent on a peak amplitude of a fluctuating sinusoidal component of a dc voltage on said energy storage capacitor.

11. A power conditioning unit according to claim 10, wherein said dc-to-ac converter comprises:
- at least one power transistor for transferring power from the input connection of the dc-to-ac converter to the output connection of the dc-to-ac converter; and
- wherein said power injection control block comprises:
- a low-pass filter coupled to said input connection of the dc-to-ac converter:
- a sensing circuit for sensing an output from the low-pass filter and comparing with a reference; and
- a driver circuit for driving said at least one power transistor responsive to said sensing to control said power transfer.

12. A power conditioning unit according to claim 11, wherein the driver circuit is configured to substantially minimize a difference between the output from the low-pass filter and the reference.

13. A power conditioning unit according to claim 11, wherein the sensing circuit is configured periodically to compare said output from the low-pass filter with said reference in synchronisation with said ac power.

14. A power conditioning unit as claimed in claim 10, further comprising a power extraction control block having an input coupled to said input for receiving power from said dc power source and having an output to control said dc-to-dc converter, wherein said power extraction control block is configured to regulate a voltage of said dc power source to control power extracted from said dc power source to said energy storage capacitor.

15. A power conditioning unit as claimed in claim 14, wherein an instantaneous ac power output has a sinusoidal shape, where said power extracted from said dc power source is substantially constant over a cycle of said ac power output, and wherein a difference between said power extracted from said dc power source and said instantaneous ac power output defines an energy mismatch which appears as said fluctuating sinusoidal component of said dc voltage on said energy storage capacitor.

16. A power conditioning unit according to claim 15, wherein said dc-to-dc converter comprises:
- at least one power transistor for transferring power from the input connection of the dc-to-dc converter to the output connection of the dc-to-dc converter; and
- wherein said power extraction control block comprises:
- a sensing circuit for sensing a voltage on said input connection of the dc-to-dc converter; and
- a driver circuit for driving said at least one power transistor responsive to said sensing to control said power transfer.

17. A power conditioning unit according to claim 16, wherein the power extraction control block further comprises a reference voltage generator, and wherein the driver circuit is configured to substantially minimise a difference between a reference voltage from said reference voltage generator and the sensed voltage.

18. A power conditioning unit as claimed in claim 10, wherein said fluctuating sinusoidal component of said dc voltage on said energy storage capacitor has a frequency of twice that of said ac power, and wherein said peak amplitude of said fluctuating sinusoidal component of said dc voltage on said energy storage capacitor is at least 30 volts.

19. A power conditioning unit as claimed in claim 10, wherein said energy storage capacitor is a non-electrolytic capacitor.

20. A photovoltaic power conditioning unit for delivering power from a dc photovoltaic power source to an ac output, the power conditioning unit being configured to maintain a substantially sinusoidal output voltage or current over a range of dc power source voltages, the power conditioning unit comprising:
- an input for receiving power from said dc power source;
- a non-electrolytic energy storage capacitor;
- a dc-to-ac converter comprising at least one power device, wherein said dc-to-ac converter is coupled to said input and to said energy storage capacitor and has an output connection coupled for delivering ac power to an ac mains power supply; and
- a power injection control block to control said dc-to-ac converter;

wherein said power injection control block is configured to control an amplitude of an ac current provided to said ac mains power supply such that an amount of power transferred to said ac mains power supply is dependent on a peak amplitude of a fluctuating sinusoidal component of a dc voltage on said non-electrolytic energy storage capacitor.

* * * * *